US008280902B2

(12) United States Patent
Lewis (10) Patent No.: US 8,280,902 B2
(45) Date of Patent: Oct. 2, 2012

(54) HIGH PRECISION SEARCH SYSTEM AND METHOD

(75) Inventor: Bernard Lewis, Oakton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 364 days.

(21) Appl. No.: 12/585,038

(22) Filed: Sep. 1, 2009

(65) Prior Publication Data
US 2011/0055241 A1 Mar. 3, 2011

(51) Int. Cl.
*G06F 17/30* (2006.01)
(52) U.S. Cl. ......... 707/766; 707/706; 707/723; 707/759
(58) Field of Classification Search .................. 707/766, 707/706, 723, 759, 726, 728, 737; 715/700; 700/766
See application file for complete search history.

(56) References Cited

U.S. PATENT DOCUMENTS

| | | | | |
|---|---|---|---|---|
| 5,515,488 A * | 5/1996 | Hoppe et al. | .................. | 345/440 |
| 6,094,652 A * | 7/2000 | Faisal | .................................... | 1/1 |
| 6,128,613 A * | 10/2000 | Wong et al. | .................... | 707/738 |
| 6,182,069 B1 * | 1/2001 | Niblack et al. | .......................... | 1/1 |
| 6,208,985 B1 * | 3/2001 | Krehel | .......................... | 707/767 |
| 6,327,590 B1 * | 12/2001 | Chidlovskii et al. | .......... | 707/734 |
| 6,411,950 B1 * | 6/2002 | Moricz et al. | .......................... | 1/1 |
| 6,421,675 B1 * | 7/2002 | Ryan et al. | .............................. | 1/1 |
| 6,434,545 B1 * | 8/2002 | MacLeod et al. | ...................... | 1/1 |
| 6,463,428 B1 * | 10/2002 | Lee et al. | ....................... | 707/750 |
| 6,574,616 B1 * | 6/2003 | Saghir | ............................ | 382/305 |
| 6,772,150 B1 * | 8/2004 | Whitman et al. | .............. | 707/721 |
| 6,925,608 B1 * | 8/2005 | Neale et al. | .................... | 715/763 |
| 7,395,260 B2 * | 7/2008 | Oral et al. | ............................ | 1/1 |
| 7,991,764 B2 * | 8/2011 | Rathod | ........................ | 707/713 |
| 2003/0126235 A1 * | 7/2003 | Chandrasekar et al. | ...... | 709/220 |
| 2005/0038866 A1 * | 2/2005 | Noguchi et al. | .............. | 709/217 |
| 2005/0114348 A1 * | 5/2005 | Wesinger et al. | ............... | 707/10 |
| 2005/0192953 A1 * | 9/2005 | Neale et al. | ....................... | 707/4 |
| 2005/0198068 A1 * | 9/2005 | Mukherjee et al. | ......... | 707/104.1 |
| 2007/0011155 A1 * | 1/2007 | Sarkar | ............................... | 707/5 |
| 2007/0061266 A1 * | 3/2007 | Moore et al. | .................... | 705/51 |
| 2007/0061487 A1 * | 3/2007 | Moore et al. | .................. | 709/246 |
| 2007/0250492 A1 * | 10/2007 | Angel et al. | ...................... | 707/4 |
| 2008/0140643 A1 * | 6/2008 | Ismalon | ........................... | 707/5 |
| 2008/0183694 A1 * | 7/2008 | Cane et al. | ........................ | 707/5 |

(Continued)

OTHER PUBLICATIONS

Kules, Bill, et al., "From keyword Search to Exploration: How result visualization Aids Discovery on the Web", Tech Report HCIL-2008-06, Univ. of MD Human Computer Interaction Lab, Feb. 2008, 57 pages.*

(Continued)

*Primary Examiner* — Jean M Corrielus
(74) *Attorney, Agent, or Firm* — Oliff & Berridge, PLC (57) ABSTRACT

A high precision search system and method receives a full-text search request from a user and processes the full-text search request to determine the meanings of key words within the search request. The high precision search system creates a graphical representation of the search request based on the key words in the search request and the frequency with which they appear. The high precision search system accepts direct user input for modifying the graphical profile. The high precision search system also provides suggestions for adding new concepts and entities to the graphical profile and improving the search results. The system offers an extreme precision option wherein paragraphs are extracted from selected documents that match the search profile.

18 Claims, 9 Drawing Sheets

U.S. PATENT DOCUMENTS

| | | | |
|---|---|---|---|
| 2008/0306921 A1* | 12/2008 | Rothmuller et al. | 707/3 |
| 2009/0228481 A1* | 9/2009 | Neale et al. | 707/5 |
| 2009/0292677 A1* | 11/2009 | Kim | 707/3 |
| 2010/0030734 A1* | 2/2010 | Chunilal | 707/3 |
| 2010/0138402 A1* | 6/2010 | Burroughs et al. | 707/706 |
| 2010/0223261 A1* | 9/2010 | Sarkar | 707/726 |

OTHER PUBLICATIONS

Zavesky, Eric, et al., "CuZero: Embracing the Frontier of Interactive Visual Search for Informed Users", MIR '08, Vancouver, British Columbia, Canada, Oct. 30-31, 2008, pp. 237-244.*

McCrickard, D. Scott, et al., "Visualizing Search results using SQWID", Georgia Institute of Technology, Atlanta, GA, © 1997, pp. 1-10.*

Jones, Steve, "Graphical Query Specification and Dynamic Result Previews for a Digital Library", UIST '98, San Francisco, CA, © 1998, pp. 143-151.*

Jones, Rosie, et al., "Generating Query Substitutions", WWW 2006, Edinburgh, Scotland, May 23-26, 2006, pp. 387-396.*

Li, Wen-Syan, et al., "Facilitating Multimedia Database Exploration through Visual Interfaces and Perpetual Query Reformulations", Proc. of the 23rd VLDB Conf., Athens, Greece, 1997, pp. 538-547.*

Lim, Joo-Hwee, et al., "Image Indexing and Retrieval Using Visual Keyword Histograms", ICME '02, vol. 1, Nov. 7, 2002, pp. 213-216.*

Li, Wen-Syan, et al., "IFQ: A Visual Query Interface and Query Generator for Object-based Media Retrieval", MMCS 1997, Ottawa, Ontario, Canada, Jun. 3-6, 1997, pp. 353-361.*

Lopez-Gulliver, Roberto, et al., "SenseWeb: Collaborative Image Collaboration in a Multi-User Interaction Environment", MM '04, New York, NY, Oct. 10-16, 2004, pp. 456-459.*

* cited by examiner

High Precision Search

New search | Search thesaurus | Settings | Save | Load | Map | — 435

BASIC SEARCH | ADVANCED SEARCH

CAPE CANAVERAL, Fla. - Atlantis'
astronauts grabbed the Hubble Space
Telescope on Wednesday, then quickly
set their sights on the difficult,
dangerous and unprecedented
spacewalking repairs they will — 405

Search    Aircraft   Antennas   Charge Coupled Devices   Detectors   Masts   New York — 420
          New York(New York)   Propellers   Radar   Translators

Concepts — 410

| Concept | Rank | |
|---|---|---|
| ☐ Missions | 98 ○ | |
| ☐ Cameras | 98 ○ | — 415 |
| ☐ Telescopes | 43 ○ | |
| ☐ Astronauts | 43 ○ | |
| ☐ Space(Room) | 36 ○ | |
| ☐ Repair | 29 ○ | |
| ☐ Orbits | 29 ○ | |
| ☐ Crews | 21 ○ | |
| ☐ Day | 21 ○ | |
| ☐ Flight | 21 ○ | |
| ☐ Launching | 21 ○ | |
| ☐ Teams(Personnel) | 21 ○ | |
| ☐ Failure | 14 ○ | |
| ☐ Scientists | 14 ○ | |
| ☐ Observatories | 14 ○ | |
| ☐ Sizes(Dimensions) | 14 ○ | |
| ☐ Earth(Planet) | 14 ○ | |
| ☐ Vision | 14 ○ | |
| ☐ Rescues | 14 ○ | |
| ☐ Blast | 14 ○ | |
| ☐ Planning | 14 ○ | |
| ☐ Spacecraft | 14 ○ | |
| ☐ Time | 14 ○ | | documents (4/757) | Semantic Analysis

Search with selected
Start external search — 430

☐ 1. ldr04892
   Category
   Top 5 concepts: Radar, Aircraft, Antennas, New York(New York), New York
   [use for search] [show fingerprint] [show abstract]
☐ 2. jic0867
   Category
   Top 5 concepts: Translators, Intermediate Frequencies, Night, Manned, Sounds(Waterways)
   [use for search] [show fingerprint] [show abstract]
☐ 3. jsm5006
   Category
   Top 5 concepts: Translators, Intermediate Frequencies, Night, Manned, Sounding
   [use for search] [show fingerprint] [show abstract]
☐ 4. ldr04834
   Category
   Top 5 concepts: Payload, Army, Programming, Requirements, Smith
   [use for search] [show fingerprint] [show abstract]
☐ 5. jic0859
   Category
   Top 5 concepts: Islam, Jordan, Intermediate Frequencies, Enemy, Us
   [use for search] [show fingerprint] [show abstract]
☐ 6. jni70113
   Category
   Top 5 concepts: Aircraft, Missions, Surveillance, Radar, Coast Guard
   [use for search] [show fingerprint] [show abstract]

<< previous | next >>

— 425

PERSON [8] –
Bill Sweetman (1)
EDO ALR (1)
EDO EL (1)
IR (1)
JANE (1)
Jane (1)
King Air (1)
TAI (1)
PLACE [15] –
ASW (1)
ATK Mission (1)
ATR (1)
Amascos mission (1)
Australia (1)
Brazil (1)
Canada (1)
Canberra (1)
Colombia (1)
Ecuador (1)
Fort Worth, Texas (1)
Greenville (1)
Greenville, Texas (1)
Indonesia (1)
Ireland (1)
ORG [15] –
Bangladesh Navy (1)

Extreme Precision Search
Entity extraction tool

| PERSON [8] – |
|---|
| Bill Sweetman (1) |
| EDO ALR (1) |
| EDO EL (1) |
| IR (1) |
| JANE (1) |
| Jane (1) |
| King Air (1) |
| TAI (1) |

| PLACE [15] – |
|---|
| ASW (1) |
| ATK Mission (1) |
| ATR (1) |
| Amascos mission (1) |
| Australia (1) |
| Brazil (1) |
| Canada (1) |
| Canberra (1) |
| Colombia (1) |
| Ecuador (1) |
| Fort Worth, Texas (1) |
| Greenville (1) |
| Greenville, Texas (1) |
| Indonesia (1) |
| Ireland (1) |

| ORG [15] – |
|---|
| Bangladesh Navy (1) |

705 — (PERSON)
710 — (PLACE)
715 — (ORG)

2 Results Found

View Entity Relationships

1  /docs/jni70113.xml

More Images Below... Operators seek low-cost options for maritime patrol Bill Sweetman * Maritime patrol aircraft have a reputation for being a rich navy's toys, but new technology and commercial airframe designs are bringing costs down all the time. Bill Sweetman explores the relatively 'affordable' end of the market More than most military systems, maritime patrol aircraft (MPA) are always on duty, particularly when deployed on what is essentially a policing mission. Outside of a major conflict, oceanic anti-submarine warfare (ASW) and anti-surface warfare (ASuW) are mostly a matter of practice and training, but littoral and sovereign-water infractions such as smuggling, fishery violations and pollution offences continue around the clock regardless of international developments. One result is that the economics of funding an MPA force are heavily driven by the cost of operating the platform itself, so that a large, complex and unique MPA airframe can be a disproportionate burden on a defence budget. Consequently, operators have turned to an increasingly wide variety of commercial or transport aircraft platforms to meet MPA requirements, and industry has developed a range of flexible mission systems to equip them. All these systems occupy a market below top-end systems such as the Boeing P-8A and Nimrod MRA.4. At their upper end, they offer a respectable ASW capability and a simple mission system can provide creditable patrol capabilities. Technical trends also favour the smaller aircraft. Modern small and medium maritime aircraft feature large-format displays and powerful optical sensors and may carry weapons and defensive avionics, but at a minimum, a radar, electro-computers, based on low-cost off-the-shelf components. New radar and electronic surveillance measures (ESM) systems feature high-performance commercial chips in their processors, cost less than their predecessors and deliver modes such as inverse synthetic aperture radar (ISAR). Even active electronically scanned array (AESA) technology is making its appearance in the market. The development of electro-optical turrets has been driven by unmanned air systems and helicopters. Mid-wave infrared focal plane array technology, delivering both high resolution and long-range surveillance, is now widely available and affordable. Fokker pioneered this market in the mid-1970s with the introduction of the F27 Maritime, and large twin-turbine aircraft have been popular among users ever since. More recently, EADS-CASA has had a good degree of success with patrol versions of the CN-235 and C-295 military cargo aircraft, while ATR - a joint venture between EADS and Alenia - has also made an impact on the market, with the ATR 42 Surveyor and ATR 72 ASW aircraft. Similarly, Bombardier's Dash 8 Q-series aircraft have proven popular. EADS-CASA passed an important milestone in March 2006 with the rollout of the first of a planned 36 CN-235 MPAs for the US Coast Guard (USCG)'s Integrated Deepwater System programme. It is due to be delivered in early 2007 and, under current plans, deliveries will be completed that year. Known to the USCG as the HC-235A medium-range surveillance (MRS) aircraft is configured for search-and-rescue missions, drug interdiction, marine

HIGH PRECISION SEARCH SYSTEM AND METHOD

BACKGROUND

The Internet and computer networks have given people and organizations increased access to an abundance of information. However, the large amount of information available has made it difficult to quickly and effectively find targeted information. Even searching a limited number of internal databases on a single network can be a long and difficult task without a proper searching method.

Two main searching methods are known: recall searching and precision searching. Recall searching, used by the vast majority of Internet search engines, has the goal of bringing back as much information as necessary to ensure that the targeted information is included. As a result, recall searching often returns far too much information, forcing the user to sift through a large amount of irrelevant search results before finding the targeted information.

Precision searching, on the other hand, has the goal of bringing back a smaller number of documents while maintaining a higher probability that the targeted information is included in the search results. However, many precision search algorithms do not effectively use a user's search request and the search results, and therefore do not successfully and efficiently return the most relevant search materials.

SUMMARY

A high precision search system and method is disclosed that can receive a full-text search request from a user. The high precision search system processes the full-text search request to determine the meanings of key words within the search request.

The high precision search system creates a graphical profile based on the key words and phrases in the search request, the frequency with which the words and phrases appear, and specificity. The graphical profile is a graphical representation of the search request that can be viewed and modified by a user. In addition to accepting direct user input for modifying the graphical profile, the high precision search system may also provide suggestions for modifying the graphical profile to improve the search results. For example, the high precision search system may provide suggestions for adding key words and phrases not yet included in the graphical profile.

In this way, the high precision search system works with the user to quickly and effectively search through databases of information, repositories, static and dynamic web pages, and search engines and retrieve the most relevant results to the user.

BRIEF DESCRIPTION OF THE DRAWINGS

Various exemplary embodiments of this disclosure will be described in detail with reference to the following figures, wherein like numerals reference like elements, and wherein:

FIG. 4 shows an exemplary graphical user interface that may be displayed to a user by the precision search system via a terminal.

FIG. 7 shows another exemplary graphical user interface that may be displayed to a user by the precision search system via a terminal.

DETAILED DESCRIPTION OF EMBODIMENTS

Figure 1:
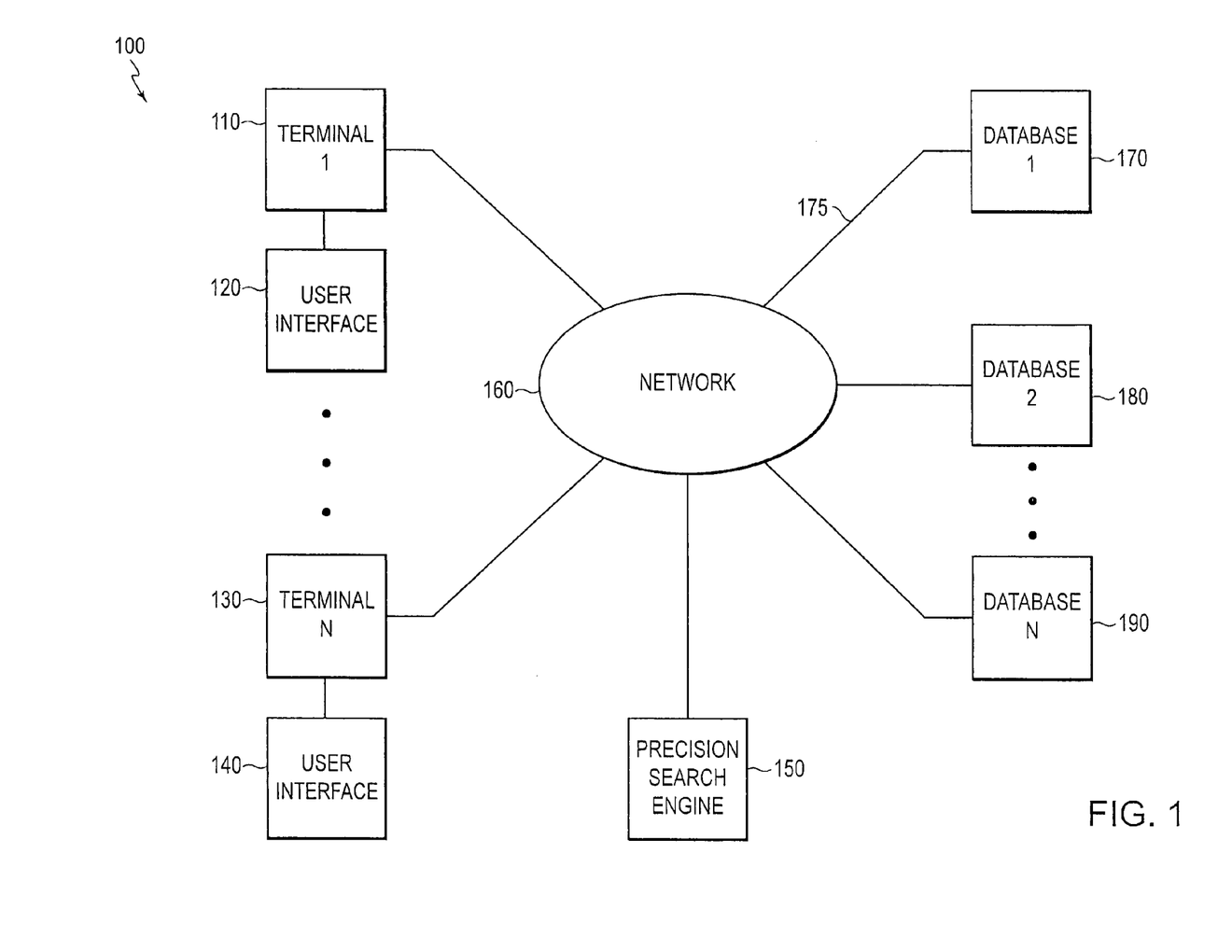
FIG. 1 shows an exemplary precision search system.

FIG. 1 shows an exemplary precision search system 100 that includes terminals 110 and 130, user interfaces 120 and 140, precision search system 150, network 160, and databases 170-190. As shown, the terminals 110 and 130, the precision search system 150, and the databases 170-190 can be in communication with the network 160 through the communication links 175.

The terminals 110 and 130 can include any device for processing data. For example, the terminals 110 and 130 can be computers, personal digital assistance (PDAs), video telephones, cellular telephones, video conference apparatus, smart or computer assisted televisions, and the like. For the purposes for the following description, it will be assumed that terminals 110 and 130 are personal computers.

As shown, the terminals 110 and 130 are coupled to the user interfaces 120 and 140, respectively. The user interfaces 120 and 140 may be any type of user interface, graphical or otherwise, that allows a user to communicate with the terminals 110 and 130. For example, the user interfaces 120 and 140 may be a keyboard and mouse, a touch screen, an audio input with a voice recognition system, a pen and writing recognition system, or any combination thereof.

The databases 170-190 can be any device or configuration of devices that stores data. The data can include any information, such as articles, newspapers, periodicals, medical records, and the like. Further, the databases 170-190 may be stored in any form of memory, such as, for example, servers on a network, hard disk drives, optical drives, RAM, ROM, flash memories, and the like. It should also be understood that while the databases 170-190 are shown as independent units coupled to the network 160, the databases 170-190 may also be included in the terminals 110 and 130, such as, for example, on a hard disk drive located in or directly connected to the terminals 110 and 130.

The network 160 may be a single network or a plurality of networks of the same or different types. For example, the network 160 may include a local telephone network in connection with a long distance telephone network. Further, the network 160 may be a data network or a telecommunications or video distribution network in connection with the data network. Any combination of telecommunications, video/audio distribution and data networks, whether a global, national, regional, wide-area, local area, or in-home network may be used without departing from the spirit and scope of the present application. For example, the network 160 may be a connection between two devices, the Internet, or anything in between. However, for the purposes of discussion, it will be assumed that the network 160 is a single integrated network that is wired and/or wireless.

The communication links 175 can be any type of wired and/or wireless circuit-oriented, packet-oriented, cell-based connection-oriented or connectionless link, including, but not limited to multiple twisted pair cable, DSL, coaxial cable, optical fiber, RF cable modems, over-the-air radio frequency, over-the-air optical wavelength (e.g., infrared), local area networks, wide area networks, intranets, virtual private networks, satellite transmission, simple direct serial-parallel wired connection, or the like, or combinations of these.

In operation of the precision search system 100, a user at the terminal 110 may input a search request using the user interface 120. The search request may be of any format, such as specific search terms or full-text created by the user or copied from an existing document. Having received the search request from the user interface 120, the terminal 110 may communicate with the precision search system 150 via the network 160 to search the databases 170-190 in accordance with the search request. For example, based on the format of the search request, the precision search system 150 may create a graphical profile from the search request that allows the precision search system 150 to search the databases 170-190 via the network 160 and retrieve search results. The graphical profile may be a graphical representation of the search request that is capable of being adjusted and modified by a user and by the precision search system 150, and will be described in greater detail below. The precision search system 150 may then communicate with the terminal 110 via the network 160 to display the graphical profile as well as the retrieved search results to the user.

Based on the displayed search results, the user may wish to further refine the search. In this case, the user may choose to edit the graphical profile using the user interface 120. For example, the user may modify search terms or weighting of search terms or re-enter a new full-text search request. Different ways in which the user may modify the graphical profile will be discussed in greater detail below.

The precision search system 150 may also provide suggestions to the user to refine the graphical profile. For example, the precision search system 150 may analyze the search results to determine changes that the user may make to the graphical profile. The precision search system 150 may then send the proposed changes to the terminal 110 to display the proposed changes to the user. The user may then choose one or more of the changes proposed by the precision search system 150 via the user interface 120.

Responsive to the user's input, the terminal 110 may send the changes to the precision search system 150, which can update the graphical profile based on the changes and then search the databases 170-190 via the network based on the updated graphical profile. Again, the precision search system 150 may communicate with the terminal 110 via the network 160 to display the retrieved search results, the updated graphical profile, and the proposed changes to the graphical profile to the user. The user may choose to refine the graphical profile repeatedly until satisfied with the search results.

It should be understood that the precision search system 150 may be implemented in hardware, software, or any combination of both. Further, while the precision search system 150 is shown as an independent unit coupled to the network 160, it may also be combined, in part or whole, into the terminals 110 and 130, the network 160, and/or the databases 170-190. For example, the precision search system 150 may be implemented as a software program that is stored on a memory, such as a hard disk drive, of the terminals 110 and 130. It should also be understood that, while shown as separate, any combination of the terminal 110, the precision search system 150, the network 160 and the databases 170-190, in part or whole, can be possible.

Figure 2:
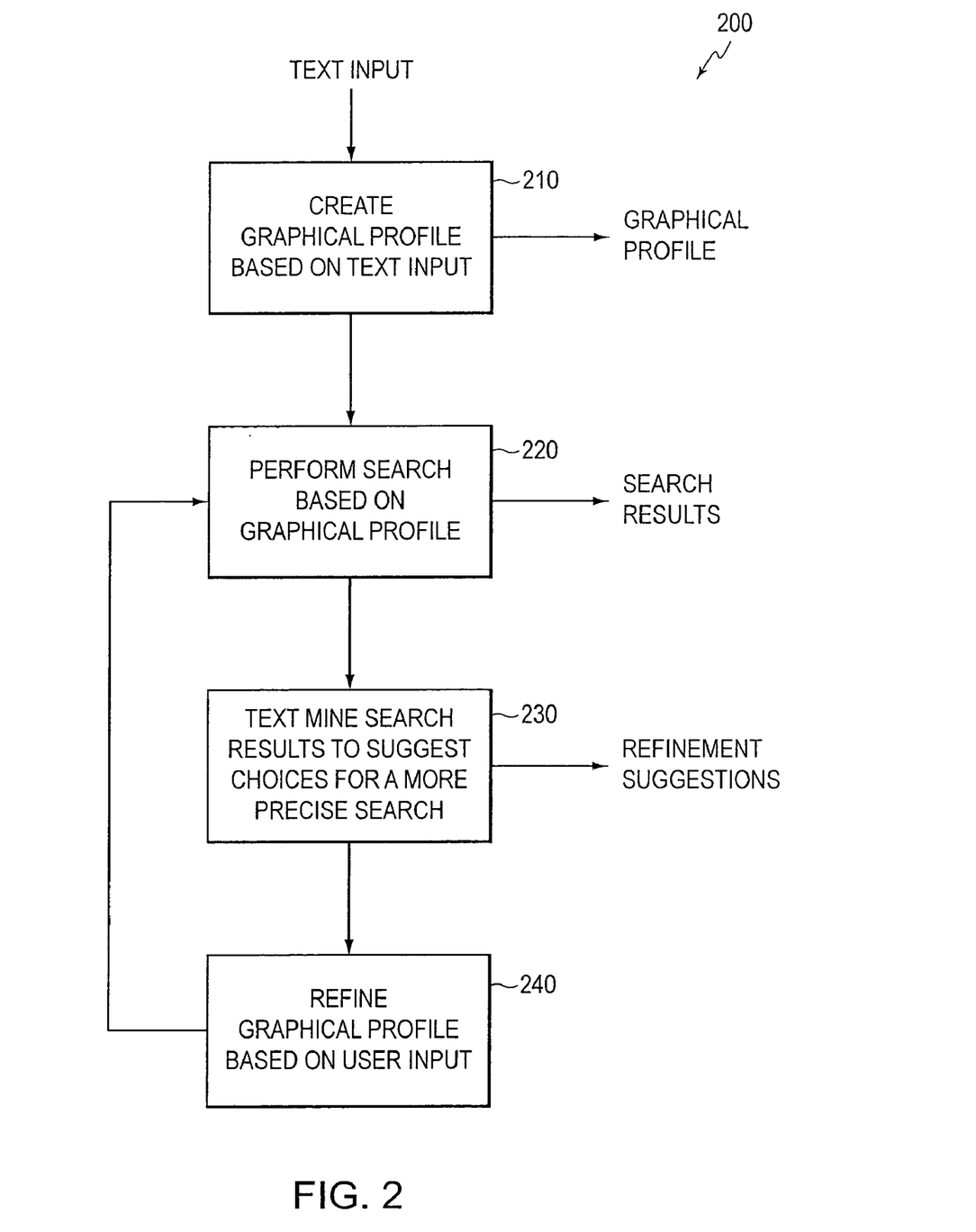
FIG. 2 shows a flow diagram outlining an exemplary process of performing a precision search.

FIG. 2 is a flow diagram outlining an exemplary process of performing a precision search, such as that which may be performed by the precision search system, for example. In block 210, a user may enter a search request in the form of text input, for example. The search request can take any form, and may be a full-text input, such as part or all of an existing document, or simply search terms entered by a user. In block 210, the precision search system can create a graphical profile based on the search request entered by the user. The graphical profile is a graphical representation of the search request entered by the user. In block 220, the precision search system can output and display the graphical profile to the user.

In block 220, the precision search system can perform a database search based on the graphical profile created in block 210, and generate search results. In this way, the graphical profile may be used as search criteria for searching databases. In block 220, the precision search system can output and display the search results to the user.

In block 230, the precision search system can analyze the search results previously generated in block 220 to determine modifications for the graphical profile that may result in a more precise search. The precision search system can then output these modifications to the user as refinement suggestions for refining the search.

In block 240, the precision search system can refine the graphical profile based on user input. For example, a user may choose one or more of the refinement suggestions suggested in block 230, and the precision search system may refine the graphical profile in accordance with the user's choices.

After refining the graphical profile in block 240, the precision search system may return to block 220 and search the databases based on the refined graphical profile. Thus, the process may cycle through blocks 220-240 in order to further refine a search, such that a precision of the search results displayed to the user increases. This iterative process may be repeated until the user is satisfied with the search results and stops choosing among the suggestions for further refining the search.

Figure 3:
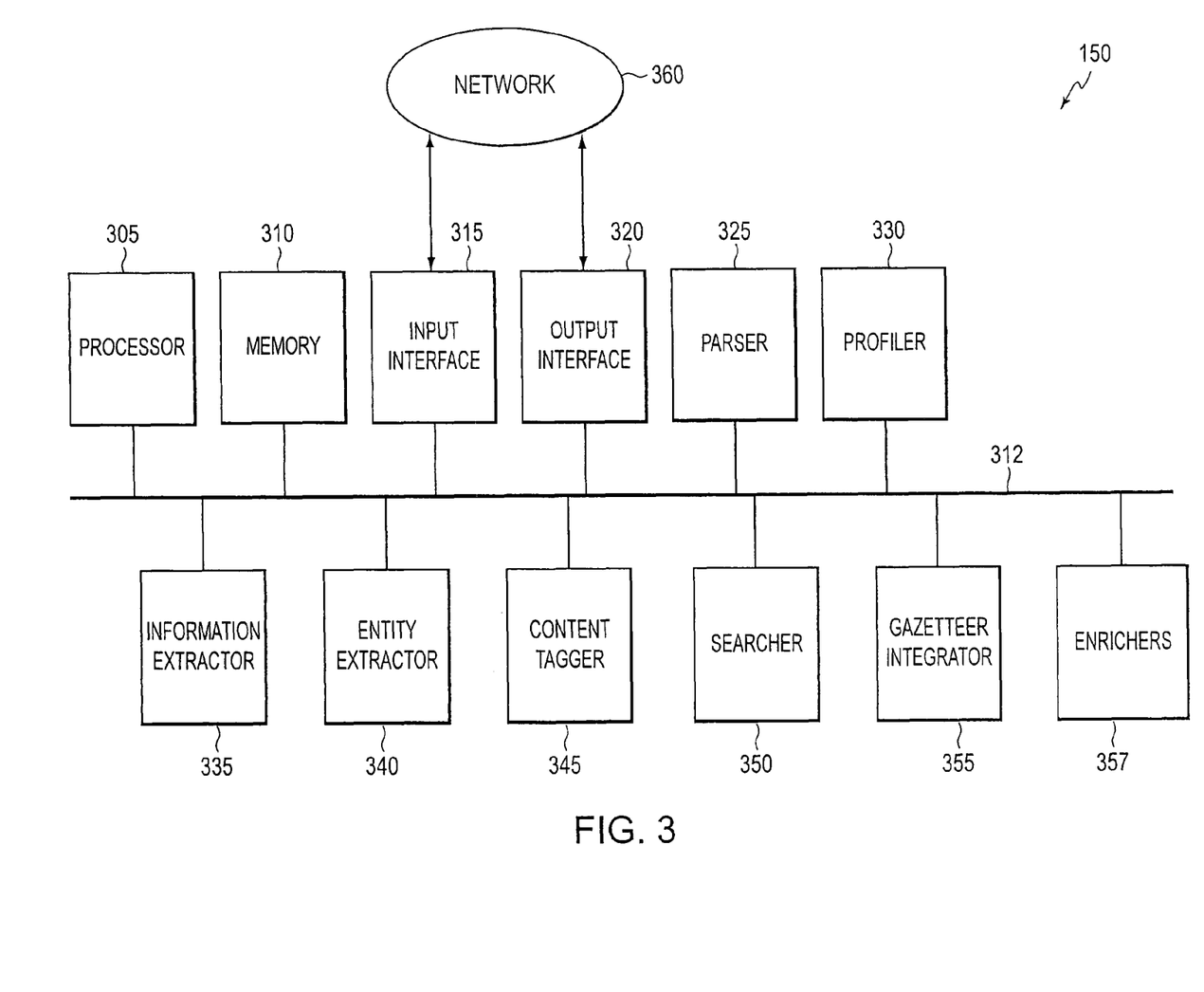
FIG. 3 shows an exemplary block diagram of precision search engine.

FIG. 3 shows an exemplary block diagram of precision search system 150. As described above with reference to FIG. 1, the precision search system 150 can use a search request to perform a precision search of one or more databases. The precision search system 150 may include processor 305, memory 310, input interface 315, output interface 320, parser 325, profiler 330, information extractor 335, entity extractor 340, content tagger 345, searcher 350, gazetteer integrator 355 and enrichers 357. As shown in FIG. 3, the above components may be coupled together by bus 312, however, it should be understood that any architecture is possible.

The memory 310 may store, among other things, one or more operational taxonomies. Taxonomies may include multiple tree structures used to define words and relationships between words. The operational taxonomies stored in the memory 310 may also be modified and updated by both the precision search system 150 and a user.

The processor 305 may be any device that instructs, transmits and/or receives data. Generally, the devices 310-357 coupled to the bus 312, operate under the control of the processor 305. For example, the processor 305 can include a processor for a work station, a server, a router, personal computer (PC), a hand held device, a personal digital assistant (PDA), and the like. During operation, a user inputs a search request via the input interface 315. In an example where the precision search system 150 is coupled to a network, such as network 360, the input interface 315 may be connected to the network 360 so as to receive the user's search request. The text inputted by the user may be in full text format, such as full text that a user copied from a text source, such as an article or from another database, for example. The input interface 315 may reformat the search request into a format readable by the parser 325, and then transmit the search request to the parser 325 under the control of the processor 305 via the bus 312.

The parser 325 may transform the full-text input into a searcher-friendly form that can be used by the profiler 330 to create the graphical profile. For example, the parser 325 may extract and define key terms from the full-text input and then determine the frequency with which those key terms appear in the full-text input.

In doing so, the parser 325 may remove extraneous words such as a, an, the, and the like. Additionally, the parser 325 may use stemming to normalize certain words. For example, the parser 325 may normalize all of the words "swim," "swimming," "swam" and "swimmers" to be "swim."

The parser 325 may also use the normalized text input as context to disambiguate between homonyms. For example, the word "tank" may have different meanings based on the context of the term. Tank may be a tank used by a military or may be a shirt, such as a tank top. The parser 325 may use context clues to determine the meaning of a specific instance of the word "tank." For example, the parser 325 may search the sentence including "tank," and/or one or more of the sentences preceding or succeeding the sentence including "tank," and compare the words in the sentences to the operational taxonomies that are associated with each instance of "tank." If, for example, the words in the sentences are only included in the taxonomy structure related to "tank" as it refers to a military vehicle, the parser 325 will determine that the instance of "tank" in the search input refers to a military vehicle and not an article of clothing.

The parser 325 may also use the normalized text input to determine the meanings of words with greater specificity by using a term frequency search and an inverse document frequency search. The parser 325 may use a term frequency search to determine the number of times a certain word appears in the normalized text input. For example, parser 325 may determine that a word, such as "cancer," appears often within a normalized text input. However, before determining that the word "cancer" is a key term, the parser 325 may use an inverse document frequency search and search the words preceding and succeeding each instance of "cancer." In this way, the parser 325 may determine, for example, that 90% of the instances of cancer are preceded by "lung." Thus, the parser 325 may determine that "lung cancer," and not simply "cancer," is a key term. Of course, in this instance, 90% is an example. A threshold percentage for an inverse document frequency search may be set to any value.

In determining the frequency of key terms within a normalized text input, the parser 325 may associate pronouns with the proper nouns to which they refer. For example, if the parser 325 encounters a pronoun, the parser 325 may search the sentence containing the pronoun and one or more sentences prior to the sentence containing the pronoun to determine candidates for the proper noun to which the pronoun refers. For example, if "she" is the pronoun, the parser 325 may only consider female proper nouns. On the other hand, any gender-neutral proper noun may be a candidate for the pronoun "it." If there is more than one proper noun candidate, the parser 325 may use either context clues or a list of predetermined, user-defined rules, which may also be stored in memory 310, to determine the corresponding proper noun.

Once the corresponding proper noun is determined, each instance of a pronoun is used in determining the frequency count for its corresponding proper noun. For example, if the parser 325 finds ten instances of the proper noun "missile," but determines that there are also five instances of the pronoun "it" referring to "missile," the frequency count of the key term "missile" will be fifteen.

Further, the parser 325 may use the gazetteer integrator 355 to disambiguate meaning based on location. For example, if part of the user input indicates that the search is being performed in the United States, or based on an article written in the United States, the gazetteer integrator 355 may help to clarify meaning based on that location. For example, in the United States, the word "chip" may refer to a potato chip. On the other hand, in the United Kingdom, the word "chip" may refer to what is known in the United States a french fry, while the word "crisp" may refer to what most Americans understand as a potato chip.

The parser 325 may also use enrichers 357 to supplement the user's search request by determining additional text related to but not included in the user's search request. Enrichers 357 may include such devices as, for example, a thesaurus enricher, an entity enricher, and a concept enricher.

The thesaurus enricher may determine synonyms for words in the normalized text input. The thesaurus enricher may determine synonyms for a given word by using the taxonomies stored in the memory 310. For example, if the key terms "plane" and "airplane" are used in a normalized text input, the thesaurus enricher may use the taxonomies stored in memory 310 to determine that the two words are synonyms. With the knowledge that the two words are synonyms, the parser 325 may extract one key term, either "plane" or "airplane," with a frequency count of two, instead of two individual key terms each with a frequency count of one.

The entity enricher may determine the entities (person, place or thing) related to the user's search request. For example, if the search request includes the term "AK-47" and "Vietnam", the entity enricher may determine that "AK-47" is a type of assault rifle and "Vietnam" is a place. The requested search can be enhanced by including the identified entities when performing the search.

Similar to the entity enricher, the concept enricher may determine the concepts related to the user's search request. Concepts may differ from entities in that concepts may be more general or abstract than an entity. For example, the term "war" may be a concept, while the term "Vietnam War" may be an entity. However, there may be some overlap between concepts and entities. For example, a term such as "aircraft" may be both a concept and an entity. The requested search may also be enhanced by including the identified concepts when performing the search.

After the parser 325 parses the text input, disambiguates between meanings of key terms, and determines the frequency of the key terms, the parser 325 transmits the parsed text input to the content tagger 345 via bus 312 under the control of the processor 305. The content tagger 345 may use XML tagging to tag some or all of the key terms in the search input based on the meanings of the words determined by the parser 325. For example, the content tagger 345 may tag key terms in the search input based on one or more of the operational taxonomies that is stored in memory 310, or in another memory accessible by the precision search system 150. The content tagger 345 may also tag all of the identified entities.

Further, if a key term is not currently in the operational taxonomy, the content tagger 345 may insert the key term into the operational taxonomy and update the taxonomy structure. For example, if a key term is not in the operational taxonomy, the content tagger 345 may add the key term as a base within the operational taxonomy. The key term may then remain in the taxonomy as a base, or may be moved within the taxonomy by a user.

The content tagger 345 may send the defined, tagged, and counted key terms to the profiler 330 via bus 312 under the control of the processor 305. The profiler 330 may then create a graphical profile based on the key terms. For example, the profiler 330 may create a graphical profile that includes the most commonly used key terms in the search input. In this sense, the profiler 330 may scan through the tagged search input and generate a frequency count for each key term or may use the frequency counts determined by the parser 325. The graphical profile may then include each key term that appears in the search input, or a subset of those terms, weighted by a number of times the key term appears in the search input. In order to make the weighting process easier for a user to understand, the weights for each key term may be normalized to a value, such as 100, for example.

The profiler 330 may also use the XML tags for each key term to consolidate key terms used in a graphical profile and generate an updated frequency count of certain key terms. For example, the profiler 330 may realize that terms "F-16" and "B-22" are both tagged as "military aircraft." Thus, instead of creating a graphical profile with two terms, F-16 and B-22, profiler 330 may create a profile with one word, "military aircraft," that takes into account the frequency of both F-16 and B-22 as well as the occurrence of any other words categorized with the same XML tag in the search term.

The profiler 330 may then output the graphical profile to the output interface 320 via bus 312 under the control of the processor 305. In an example where precision search system 150 is coupled to a network, such as network 360, the output interface 320 may be coupled to the network 360 so as to output information across the network. For example, the output interface 320 may be connected to a terminal 110 via a network 160 as shown in FIG. 1. In this case, the network 360 and the network 160 may be the same networks or two different networks connected to each other. Thus, the graphical profile may be displayed to the user so that the user may understand how the inputted full-text search request is being used to implement a search of the databases.

FIG. 4 shows an exemplary graphical user interface 400 which may be displayed on terminal 110 and may include a display of the graphical profile 410. As can be seen in FIG. 4, the graphical profile 410 includes a listing of key terms included in the search input, along with rankings for each of the key terms. The rankings determine the relative importance of a certain key term in a search request. For example, FIG. 4 shows the key terms in the graphical profile displayed with a ranking normalized to one hundred, although any ranking system may be used.

Returning to FIG. 3, precision search system 150 may also save, load and share graphical profiles. For example, a user at terminal 110 may instruct the precision search system 150 to save a current graphical profile. In this case, the input interface 315 will instruct the profiler 330 to send and save the current profile via the bus 312 under the control of the processor 305. Thus, the graphical profile may be saved in the memory 310 or in any other memory accessible by the precision search system 150. Similarly, if a user decides to use a previously saved graphical profile, the profiler 330 may retrieve the previously saved graphical profile from the memory 310 via the bus 312 under the control of the processor 305. In this case, the profiler 330 does not need to create a graphical profile, which may save processing time. Further, users may be able to share saved graphical profiles via network 160 by saving the graphical profiles in memory locations that are accessible by other users of the system.

The profiler 330 may also output the graphical profile to the searcher 350 via bus 312 under the control of the processor 305. The searcher 350 may use the graphical profile to search the databases 170-190. For example, the searcher 350 may use the key terms and their relative rankings in the graphical profile to determine which documents in databases 170-190 best match the current graphical profile. A higher ranking in the graphical profile means that the searcher 350 will place a greater emphasis on that term being included in the search results. On the other hand, a lower relative ranking will mean that the searcher 350 will assign a lesser importance to a given key word.

The searcher 350 may then send the search results to the output interface 320 via bus 312 under the control of the processor 305. As discussed above, the output interface 320 may be connected to one or more networks so as to output information across the networks. For example, the output interface 320 may be connected to the terminal 110 via the network 160 as shown in FIG. 1. Thus, the search results may be displayed to the user on the terminal 110. In this way, the user may be presented with a graphical profile as well as the search results from the graphical profile.

The searcher 350 may also send the search results to the entity extractor 340 via the bus 312 under the control of the processor 305. The entity extractor 340 may perform text mining on the search results, or a subset thereof, to extract entities from the search results that are not included in the graphical profile, in order to provide a user with suggestions for improving a future search. Examples of an entity include, for example, a person, place or thing. Thus, the entity extractor 340 may analyze the search results to determine entities that appear in the search results but were not included in the graphical profile. The search results may be analyzed on a document-by-document basis, or on a basis of the search results as a whole.

For example, the entity extractor 340 may parse through a first search result to determine entities with a highest frequency of occurrence. A threshold frequency may be set so that only words occurring with a frequency greater than the threshold frequency may be displayed. On the other hand, the entity extractor 340 may only display those terms occurring with the highest frequency, such as the top ten, for example. The entity extractor 340 may perform entity extraction for each document, and may then aggregate the data to determine which entities occur with the highest frequencies.

The entity extractor 330 may then send the extracted entities occurring with the highest frequencies, or occurring with a frequency greater than a threshold frequency, to the output interface 320 via bus 312 under the control of processor 305. In this way, as discussed above, the entities may be displayed to a user along with the graphical profile and search results.

The searcher 350 may also send the search results to the information extractor 335 via bus 312 under the control of processor 305. The information extractor 335 may extract concepts from the search results that are not a part of the graphical profile in a method similar to that used by the entity extractor 340. However, the information extractor 335 is different than the entity extractor 340 in that the information extractor 335 relies on the operational taxonomy stored in memory 310 to determine suggested concepts. For example, the information extractor 335 may text mine the search results to find concepts in the search results that were not included in the search request. The information extractor 335 may compare these concepts to the operational taxonomy to determine which concepts to suggest as search improvements. For example, the information extractor may only suggest as search improvements concepts that are included in the search results and the operational taxonomy, but were omitted from the search request.

As previously discussed, concepts may differ from entities in that concepts may be more general or abstract than an entity. For example, the term "war" may be a concept, while the term "Vietnam War" may be an entity. However, there may be some overlap between concepts and entities. For example, a term such as "aircraft" may be both a concept and an entity.

The information extractor 335 may send the extracted concepts to the output interface 320 via the bus 312 under the control of processor 305. In this way, as discussed above, the concepts may be displayed to a user along with the graphical profile, the search results and extracted entities.

A user may not be satisfied with the search results returned on a first search. For example, an initial search may return thousands of search results making it difficult for a user to analyze all of the search results in a time-efficient manner. Accordingly, a user may wish to modify the graphical profile in a way that may narrow the search results, eliminating search results that are less pertinent to a user's intended search. A user may modify the graphical profile in several different ways.

As a first way for modifying the graphical profile, a user may simply modify the relative weighting scales assigned to each of the terms in the graphical profile. The user may make such modifications via the user interface 120 connected to the terminal 110. The terminal 110 may send the modifications input by the user to the input interface 315 of the precision search system 150 via the network 160. Then, the input interface 315 may send the modifications to the profiler 330 via the bus 312 under the control of the processor 305. The profiler 330 may modify the graphical profile based on the modifications input by the user to generate a modified graphical profile. The profiler 330 may then send the modified graphical profile to the output interface 320 via the bus 312 under the control of the processor 305. Then, the output interface 320 may output the modified graphical profile to the terminal 110, via the network 160, for example, to reflect the user's desired change on the terminal 110.

Another way the user may modify the graphical profile is to add one or more of the entities extracted by the entity extractor 340 to the graphical profile. As discussed above, the extracted entities are chosen so as to ensure that none of the entities displayed in entity cloud are in the graphical profile. Thus, when a user selects one or more of the extracted entities, that entity is added to the graphical profile. A user may perform similar selections with the extracted concepts. Similarly, extracted concepts are chosen so as to ensure that none of the extracted concepts are in the graphical profile. The user may select any of the entities or concepts via the user interface 120 connected to the terminal 110. The terminal 110 may send the selected concepts and/or entities to the input interface 315 of the precision search system 150 via network 160. Then, the input interface 315 may send the selected concepts and/or entities to the profiler 330 via bus 312 under the control of the processor 305. The profiler 330 may modify the graphical profile based on the modifications input by the user to generate a modified graphical profile. The profiler 330 may then send the modified graphical profile to the output interface 320 via the bus 312 under the control of the processor 305. Then, the output interface 320 may output the modified graphical profile to the terminal 110, via the network 160, for example, to reflect the user's desired change on the terminal 110.

Yet another way a user may modify the graphical profile is by adopting a graphical profile that is representative of one or more of the search results. Thus, using the user interface 120, the user may choose to adopt a graphical profile corresponding to one or more of the search results as the graphical profile used for the search. Responsive to the user input, the terminal 110 may send a command to create a new graphical profile to the input interface 315 of the precision search system 150 via the network 160. Then, the input interface 315 may send the command to create the new graphical profile to the profiler 330 via bus 312 under the control of the processor 305. Responsive to the command, the profiler 330 may create a graphical profile based on the one or more search results. If only one search result is used, the profiler 330 may create a graphical profile of the search result in the same way that it created a graphical profile for the search request. If more than one search result is used, the profiler 330 may create separate graphical profiles for each search result and then combine the profiles, such as by averaging weights assigned to the words in the profile. Alternatively, the profiler 330 may combine the text of the search results and create a single graphical profile from the combined text. The profiler 330 may then send the modified graphical profile to the output interface 320 via the bus 312 under the control of the processor 305. Then, the output interface 320 may output the modified graphical profile to the terminal 110, via the network 160, for example, to reflect the user's desired change on the terminal 110.

Still another way a user may modify the graphical profile is by using the gazetteer integrator 355 to narrow or expand the search geographically. For example, some of the extracted key words from the search request may include geographical locations. The gazetteer integrator 355 may plot these locations on a map and present them to a user. A user may select a desired location or region on the map to expand or narrow the search results to include documents that are related to only the location or region. The gazetteer integrator 355 may then send this changes to the profiles 330 via the bus 312 under the control of the processor 305. The profiler 330 can modify the graphical profile according to the changes, and may then send the modified graphical profile to the output interface 320 via the bus 312 under the control of the processor 305. Then, the output interface 320 may output the modified graphical profile to the terminal 110, via the network 160, for example, to reflect the user's desired change on the terminal 110.

When the user is satisfied with the modified graphical profile, the user can initiate another search based on the modified graphical profile via the user interface 120. Responsive to the user input, the terminal 110 can send a command to perform a search to the input interface 315 via the network 160. Then, the input interface 315 can send the command to perform the search to the searcher 350 via bus 312 under the control of the processor 305. The searcher 350 searches the databases based on the modified graphical profile, and may then output the search results to the output interface 320 via the bus 312 under the control of the processor 305. The output interface 320 may then output the search results to the terminal 110 via the network 160 to be displayed to the user.

The precision search system 150 may also create graphical profiles of some or all of the search results in a way similar to that described above with respect to the search request. For example, precision search system 150 can use parser 325 to extract key terms from the search results and determine a frequency with which each term appears. Similarly, the precision search system 150 may use content tagger 345 to apply XML tagging to key terms in each of the search results. These operations can be performed automatically as the search results are generated. Alternatively, these operations may be performed upon receiving instructions from a user.

While, as an example, the precision search system 150 is illustrated using a bus architecture, any other type of convenient architecture may be used. Additionally, components

305 and 315-355 can be implemented using any variety of technologies such as PLI, PAL, application specific integrated circuits (ASICs), off-the-shelf components, etc. Components 305 and 325-335 can be implemented in hardware by a general-purpose processor or a special purpose processor or may be implemented by software in one or more processors. The memory 310 may be hard disk, RAM, ROM, flash memories, bubble memories, etc. The input and output interfaces 315 and 320, respectively, may be any type of interface such as network interfaces using wired, wireless, optical, etc. technologies, internal device interfaces, etc. These interfaces may implement standard protocols such as TCP/IP, USB, IEEE 1394, etc.

As described above, FIG. 4 shows an exemplary graphical user interface 400 that may be displayed to a user via the terminal 110. The graphical user interface 400 can include a search request input 405, a graphical profile 410 having slide bar rankings 415 for each key term in the graphical profile, a concept cloud 420, an entity list 425, search results 430 and a toolbar 435.

As discussed above, a user may enter a full-text search request into search request input 405 and then click search. Precision search system 150 can then generate and display graphical profile 410, search results 430, concept cloud 420 and entity list 425, as discussed above.

As shown in FIG. 4, the graphical profile 410 can include a list of the key terms that appear with the greatest frequency in the search request. Also, the graphical profile 410 may include slide bar rankings 415 that display to the user the relative frequencies with which the terms appear in the search request.

The graphical profile 410 is capable of being modified by a user. For example, each of the slide bar rankings 415 may be adjusted by the user to change the relative rankings of each of the key terms within the graphical profile 410. Thus, if a user moves the slide bar ranking 415 for a key term all the way to the right, a ranking of 100 will appear, indicating that the key term must be included in any returned search results. On the other hand, if a user moves the slide bar ranking 415 all the way to the left, a ranking of 0 will appear, signifying that the key term is not important. As a result, the key term with a 0 ranking will be dropped from the graphical profile during the next search iteration. When the user is finished modifying the graphical profile in this way, the user may wish to update the search by pressing the "Search" button on the search request input 405. The precision search system 150 will update the search using the modified graphical profile.

The search results 430 may be displayed as shown in the exemplary graphical user interface 400. For example, the search results 430 can be displayed in accordance with their relevancy to the current graphical profile, and may include a list of the top 5 concepts extracted from each of the search results.

As shown in the exemplary graphical user interface 400, the concept cloud 420 and the entity list 425 may display concepts and entities, respectively, in accordance with their relevancy to the search request. For example, as shown in FIG. 4, concepts displayed in the concept cloud 420 may appear in bold, or in a larger font, if they are more relevant to the search request than other concepts based on frequency, specificity and/or additional parameters. The entity list 425 may display entities in a similar fashion. Also, the entity list 425 may list the entities by categories.

As discussed above, a user may choose to modify the graphical profile by adding one or more entities and/or concepts to the graphical profile. For example, a user may choose one of the concepts in concept cloud 420 or one of the entities in entity list 425 by clicking on the concept or entity, or by dragging and dropping the concept or entity into the graphical profile 410. The concept or entity may be added to the graphical profile 410 with a default slide bar ranking that may be adjustable by the user after adding the concept or entity to the graphical profile. Alternatively, the concept or entity may have an initial slide bar ranking that corresponds to a frequency of occurrence in the search results.

As discussed above, a user may choose to save a graphical profile or load a pre-saved graphical profile for a search. For example, a user may click "Save" on toolbar 435 to save an existing graphical profile for future use. Similarly, a user may choose to load a pre-saved graphical profile by clicking "Load" on toolbar 435. Also, if the precision search engine is connected to a network, users can share graphical profiles by saving to locations accessible to other users on the network.

Figure 5:
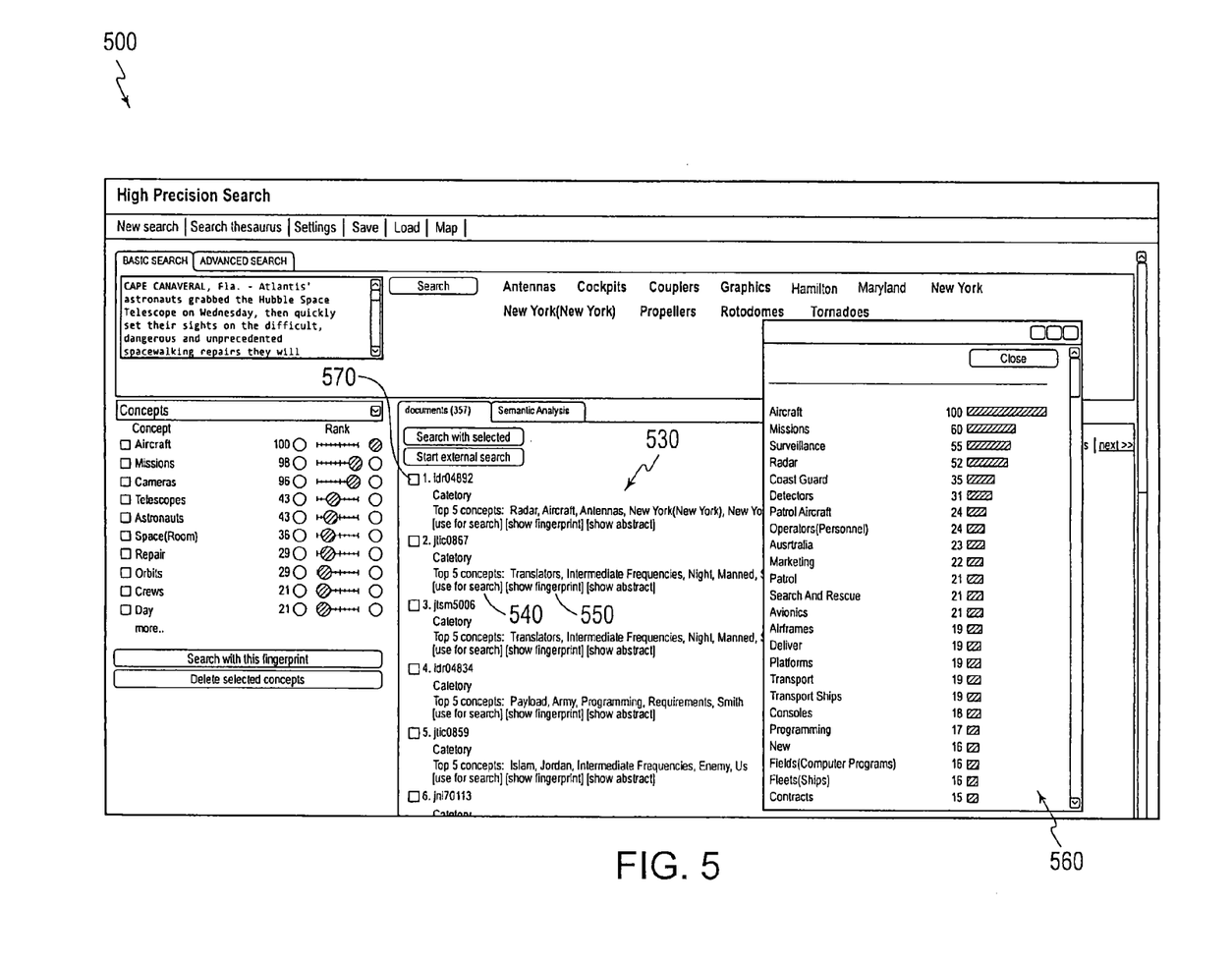
FIG. 5 shows another exemplary graphical user interface that may be displayed to a user by the precision search system via a terminal.

FIG. 5 shows another exemplary graphical user interface 500 that may be displayed to a user via terminal 110. As shown in FIG. 5, search results 530 may allow a user to view a graphical profile for each search result and use a specific graphical profile created from a search result as the graphical profile for the search request.

For example, the "show fingerprint" option 550 allows a user to view a graphical profile 560 for each of the search results 530. As discussed above, the graphical profile 560 may be generated by the precision search system 150 for each search result in the same way that the precision search system 150 creates a graphical profile for the search input. In this way, the user can view a graphical profile for each of the search results.

A user may choose to adopt the graphical profile based on the search result as the graphical profile to be used for the search. For example, the user may choose the "use for search" option 540 as shown in the exemplary graphical user interface 500. This way, the graphical profile 560 corresponding to the selected search result will replace the graphical profile that was derived from the search request.

Figure 6:
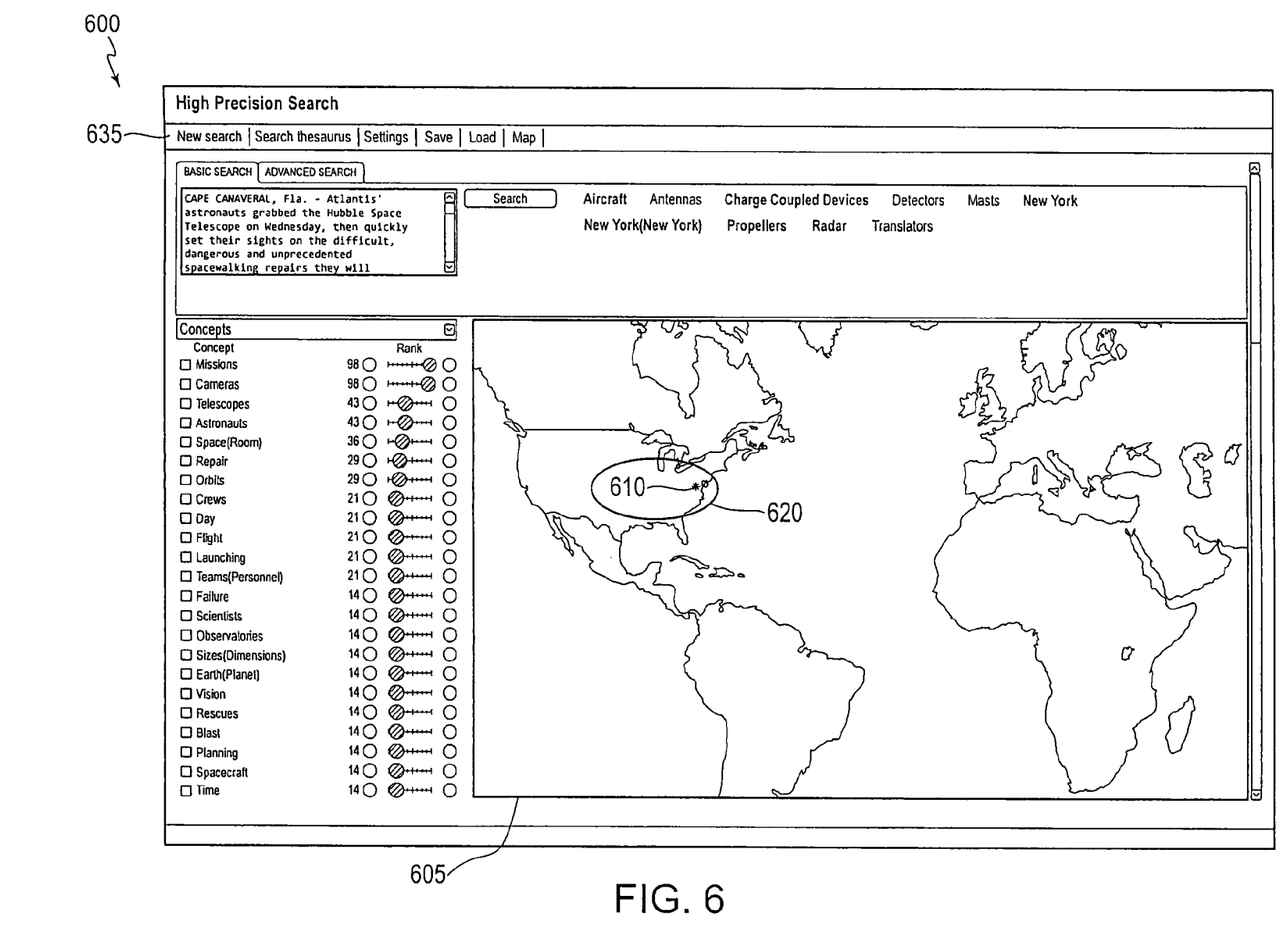
FIG. 6 shows another exemplary graphical user interface that may be displayed to a user by the precision search system via a terminal.

FIG. 6 shows another exemplary graphical user interface 600 that may be displayed to a user via terminal 110. As discussed above, a user may want to narrow or broaden a search geographically. For example, certain key terms displayed in the graphical profile 600 may be locations, such as New York. A user may want to limit the geographical extent of the search to a certain radius around the location, New York. When the user selects the "Map" option on toolbar 635, a map 605 may be displayed, including the locations 610 included in the search request. For this exemplary graphical user interface, it is assumed that only New York was included in the search request. The user can then set the geographical range of the search by drawing a region 620 on the map encompassing one or more of these locations 610. Responsive to the user input, the search results may be modified such that search results without a geographical reference within the region 620 are excluded from the search results.

FIG. 7 shows another exemplary graphical user interface 700 that may be displayed to a user via terminal 110. As discussed above, the precision search system 150 may create graphical profiles for each of the search results, and may use XML tagging to tag the content in each of the search results. The precision search system 150 may also include an extreme precision component that uses the graphical profiles and tagged content of the search results. For example, a user may want to see all of the people listed in a particular search result. Because the content tagger 345 has tagged the content in the search results, as discussed above, a user at user interface 120 may be able to view all of the people, places, organizations, and the like, included in the search result. For example, FIG.

7 shows lists of people 705, places 710 and organizations 715 that are included in a given search result.

Also, precision search system 150 may display pertinent paragraphs within the search results that include the selected people, places or organizations. For example, exemplary graphical user interface 700 shows a paragraph including "Bill Sweetman," one of the people included in the extreme precision search results.

Figure 8:
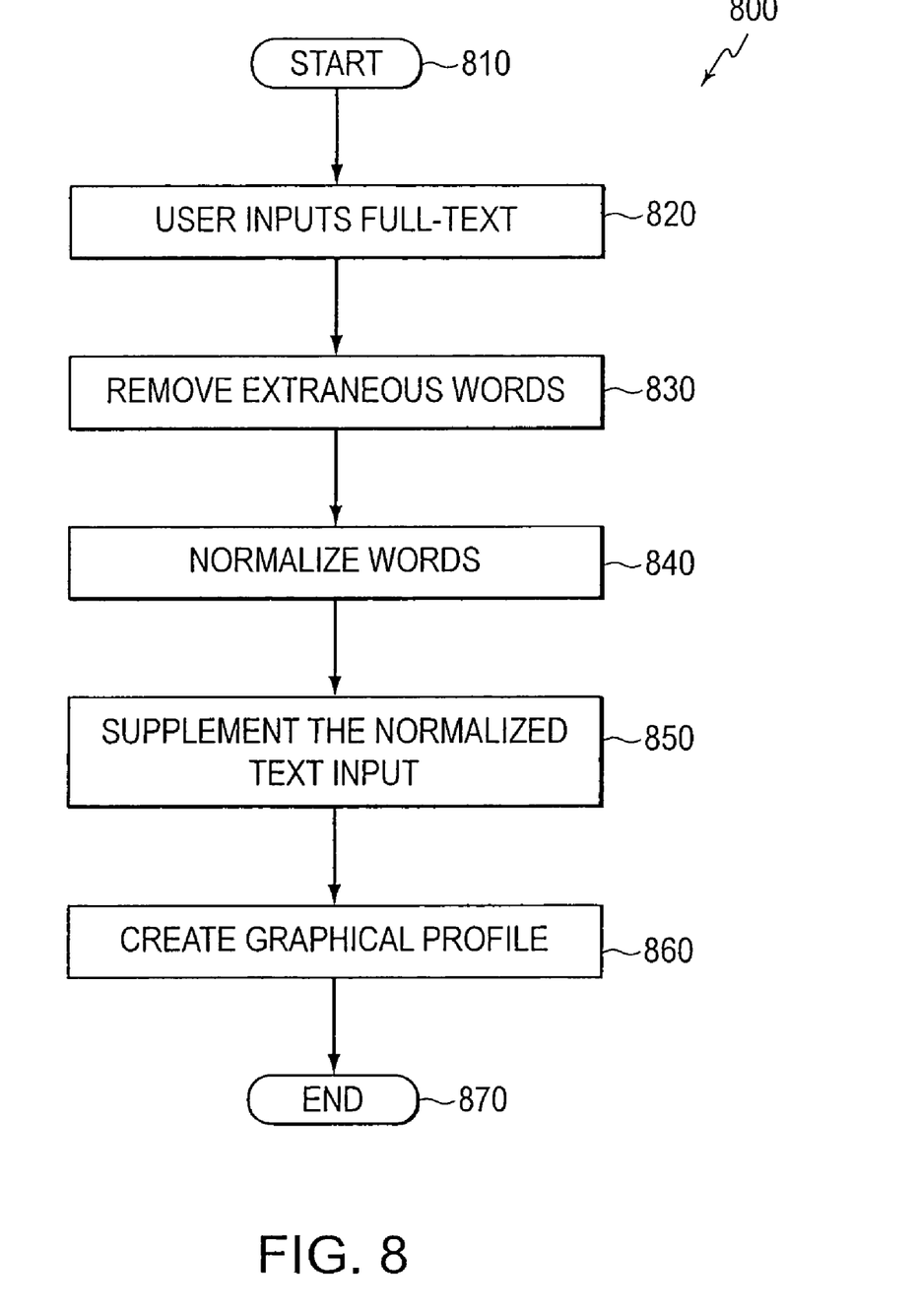
FIG. 8 shows an exemplary process for creating a graphical profile.

FIG. 8 shows an exemplary process 800 for creating a graphical profile. The process 800 may be performed by precision search system 100, for example.

The process starts at step 810 and moves to step 820, where a user inputs a full-text search request, and the process proceeds to step 830. At step 830, the precision search system may remove extraneous words, such as "a," "an," "the," and the like, and the process proceeds to step 840. In step 840, the precision search system may normalize words using stemming, for example, and the process proceeds to step 850.

At step 850, the precision search system may enhance the text input. For example, as discussed above, the precision search system may disambiguate the meaning of words based on operational taxonomies, use XML tagging, use enrichers (thesaurus, entity, and concept), use context clues, use geographical location, and the like. The process proceeds to step 860.

At step 860, the precision search system may create a graphical profile based on the normalized text input whose word meanings have been determined in step 850. The process ends at step 870.

Figure 9:
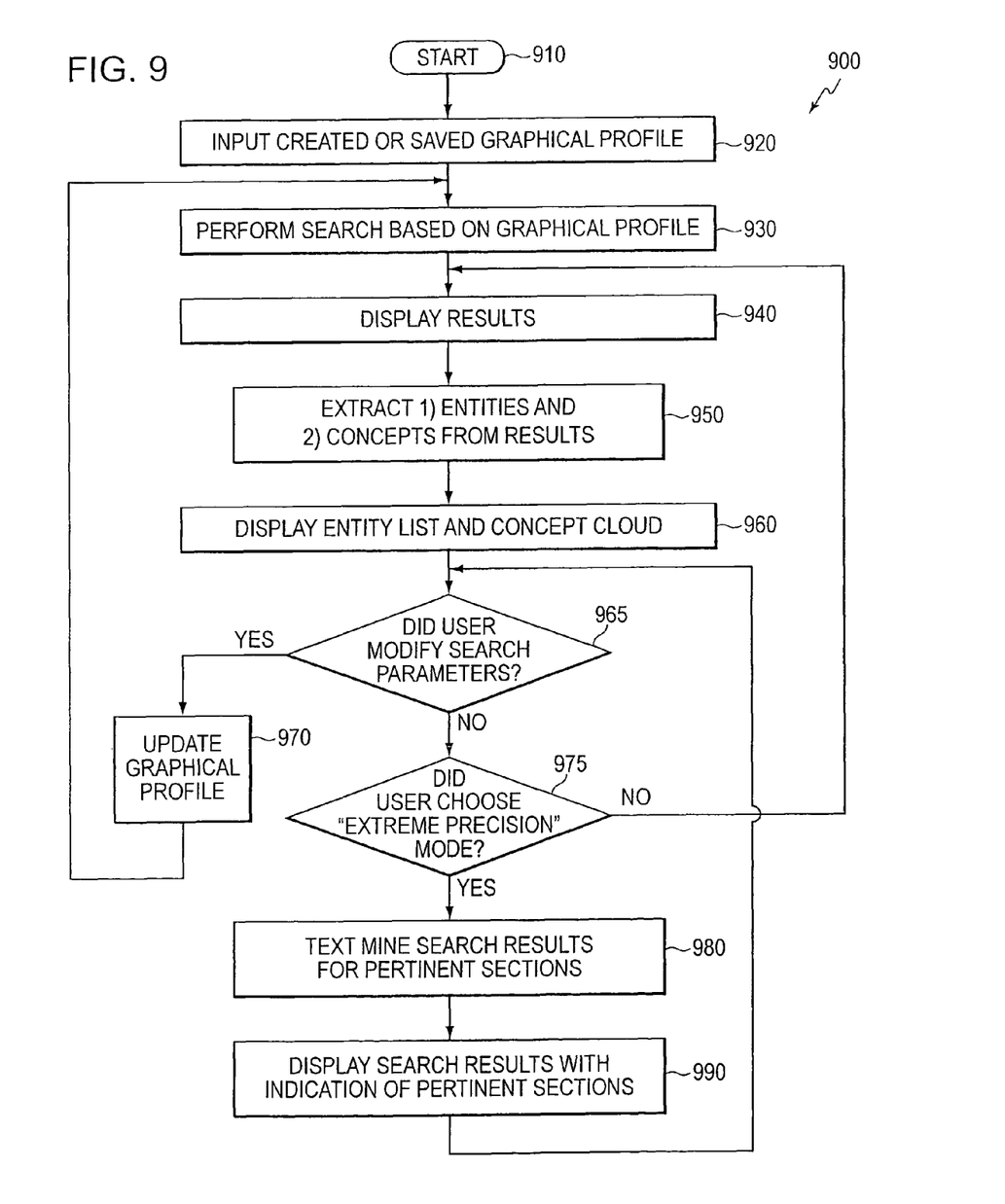
FIG. 9 shows an exemplary process 900 for performing a high precision search.

FIG. 9 shows an exemplary process 900 for performing a high precision search which may be performed by the precision search system 100, for example. The process begins at step 910 and proceeds to step 920, where the precision search system inputs a graphical profile. The graphical profile may be generated by a process discussed above with regard to FIG. 8 or may be a saved graphical profile that was used in a previous search. The process proceeds to step 930.

At step 930, the precision search system performs a search based on the graphical profile and the process proceeds to step 940. At step 940, the precision search system displays the search results and the process proceeds to step 950.

At step 950, the precision search system extracts entities and concepts from the search results, as discussed above. Thus, the precision search system may also use XML tagging to tag the content in the search results. The process proceeds to step 960.

At step 960, the precision search system displays the entity list and concept cloud including the extracted entities and concepts, respectively and the process proceeds to step 965.

At step 965, the precision search system determines whether the user modified the search parameters by modifying the graphical profile. If, at step 965, the precision search system determines that the user did modify the graphical profile, the process proceeds to step 970 and the precision search system updates the graphical profile based on the user's modifications. The process returns to step 930 and performs a search based on the revised graphical profile.

If, at step 965, the precision search system determines that the user did not modify the graphical profile, the process proceeds to step 975. At step 975, the precision search system determines whether the user chose extreme precision mode. If, at step 975, the precision search system determines that the user did not choose extreme precision mode, the process returns to step 940.

If, at step 975, the precision search system determines that the user did choose extreme precision mode, the process proceeds to step 980, where the precision search system text mines the search results to determine relevant people, places, organizations, and the like, within the search results. The process proceeds to step 990.

At step 990, the precision search system displays the key terms along with an indication of pertinent sections where the search results include those key terms. The process returns to step 965.

As shown in FIG. 9, the process 900 may continuously wait for user input to update a search. Alternatively, the process 900 may automatically stop at a predetermined time, or when a number of search results reaches a predetermined threshold level.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A precision search method comprising:
   receiving a full-text search request;
   transforming the full-text search request to create a graphical profile that is a graphical representation of key terms in the full-text search request;
   searching one or more databases based on the graphical profile to return search result;
   extracting entities from the returned search results that are not included in the graphical profile as a set of suggested modifications to the graphical profile;
   extracting concepts from the search results that are not included in the graphical profile but are included in an operational taxonomy; and
   determining the suggested modifications to the graphical profile based on the extracted entities and the extracted concepts.

2. The precision search method according to claim 1, further comprising:
   displaying the suggested modifications to the graphical profile;
   receiving an instruction from a user for how to modify the graphical profile;
   modifying the graphical profile in accordance with the instruction from the user; and
   searching the one or more databases again based on the modified graphical profile to return updated search results.

3. The precision search method according to claim 2, wherein the instruction from the user includes choosing one of the suggested modifications to the graphical profile that was displayed.

4. The precision search method according to claim 1, further comprising:
   creating a substitute graphical profile from one or more of the search results; and
   using the substitute graphical profile as the graphical profile used to search the one or more databases.

5. The precision search method according to claim 1, further comprising:
   assigning XML content tags to the key terms in the graphical profile based on at least one of operational taxonomy, concept and entity; and
   if a key term is not located in the at least one of operational taxonomy, concept and entity, updating the operational taxonomy to include the key term.

6. The precision search method according to claim 1, wherein the graphical profile includes a frequency ranking for each key term in the graphical profile that indicates a relative frequency with which each key term appears in the full-text search request.

7. The precision search method according to claim 6, wherein the frequency ranking for each key term takes into account the-a number of times a pronoun refers back to the key term as part of the relative frequency with which each key term appears in the full-text search request.

8. The precision search method according to claim 1, further comprising:
saving the graphical profile in a memory; and
sharing the saved graphical profile with another user.

9. A precision search engine comprising:
a processor that controls the precision search engine;
an input interface that receives a full-text search request;
a profiler that transforms the full-text search request into a graphical profile that is a graphical representation of key terms in the full-text search request;
a searcher that searches one or more databases based on the graphical profile to return search results;
an entity extractor that extracts entities from the search results that are not included in the graphical profile as a first set of suggested modifications to the graphical profile; and
an information extractor that extracts concepts from the search results that are not included in the graphical profile but are included in an operational taxonomy as a second set of suggested modifications to the graphical profile.

10. The precision search engine according to claim 9, further comprising:
an output interface to output the graphical profile to a user, wherein
the input interface is configured to receive an instruction from the user for how to modify the graphical profile,
the profiler modifies the graphical profile in accordance with the instruction received from the user, and
the searcher searches the one or more databases again based on the modified graphical profile to return updated search results.

11. The precision search engine according to claim 10, wherein the instruction from the user includes choosing one of the suggested modifications to the graphical profile that was output to the user.

12. The precision search engine according to claim 11, wherein
the profiler creates a substitute graphical profile for one or more of the search results, and
the searcher uses the substitute graphical profile to search the one or more databases.

13. The precision search engine according to claim 9, further comprising:
an XML content tagger that assigns XML content tags to the key terms in the graphical profile based on the operational taxonomy and updates the operational taxonomy to include any key terms in the graphical profile that are not located in the operational taxonomy.

14. The precision search engine according to claim 9, wherein the graphical profile includes at least one of a frequency ranking and a specificity ranking for each key term in the graphical profile that indicates at least one of a relative frequency and specificity with which each key term appears in the full-text search request.

15. A precision search system comprising:
a terminal configured to receive a full-text search request from a user interface;
one or more databases storing information to be searched; and
a precision search engine, the precision search engine being configured to:
receive the full-text search request from the terminal,
create a graphical profile from the full-text search request that is a graphical representation of key terms in the full-text search request,
search the one or more databases based on the graphical profile to return search results, send the search results to the terminal,
extract entities from the returned search results that are not included in the graphical profile as a set of suggested modifications to the graphical profile,
extract concepts from the search results that are not included in the graphical profile but are included in an operational taxonomy, and
determine the suggested modifications to the graphical profile based on the extracted entities and the extracted concepts.

16. The precision search system according to claim 15, wherein:
the terminal is configured to:
display the suggested modifications to a user,
receive an instruction from the user for how to modify the graphical profile, and
send the instruction to the precision search engine; and
the precision search engine is configured to:
receive the instruction from the terminal,
modify the graphical profile in accordance with the instruction,
search the one or more databases again based on the modified graphical profile, and
send updated search results to the terminal.

17. The precision search system according to claim 15, wherein the graphical profile includes a frequency ranking for each key term in the graphical profile that indicates at least one of a relative frequency and a specificity with which each key term appears in the full-text search request.

18. The precision search system according to claim 15, further comprising:
another terminal, the precision search engine being configured to allow the user at the terminal share the graphical profile with another user at the another terminal.

* * * * *